Jan. 31, 1956    R. M. HENDERSON    2,732,690
ICE BARS AND MACHINE FOR AND METHOD OF MAKING SAME
Filed June 29, 1950    3 Sheets-Sheet 1

INVENTOR.
Ray M. Henderson
BY Lampshee and Van Valkenburgh
ATTORNEYS.

Jan. 31, 1956  R. M. HENDERSON  2,732,690
ICE BARS AND MACHINE FOR AND METHOD OF MAKING SAME
Filed June 29, 1950  3 Sheets-Sheet 2
FIG. 2.
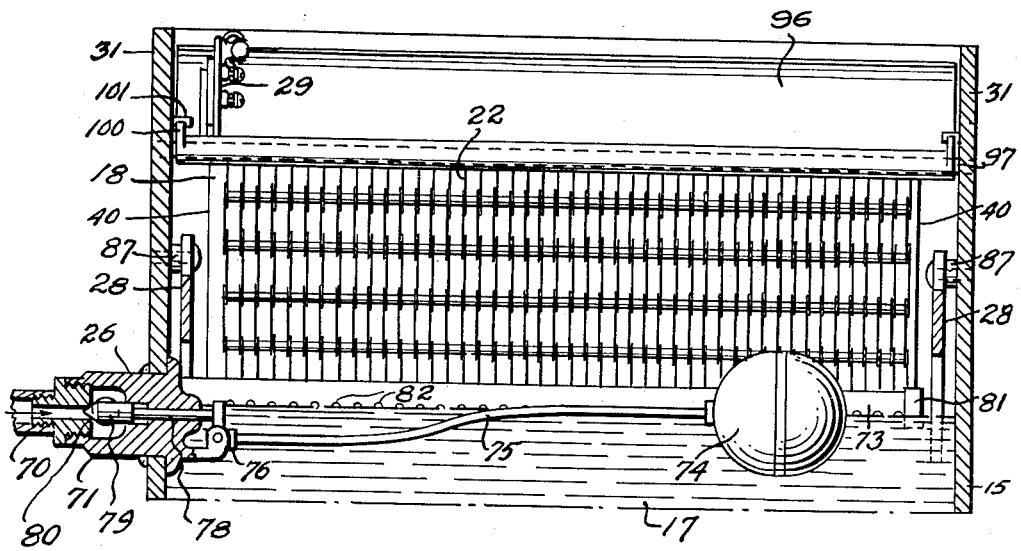
FIG. 5.    FIG. 6.    FIG. 3.
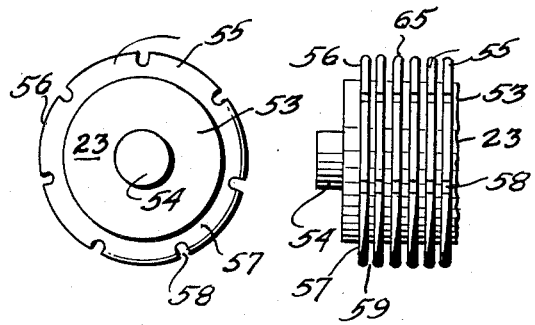
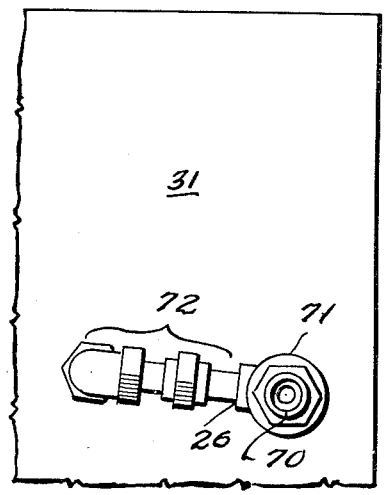
FIG. 7.    FIG. 8.
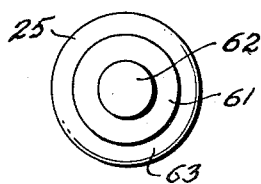 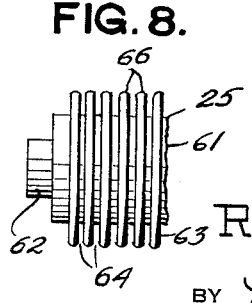
INVENTOR.
Ray M. Henderson
BY Lamphere and Van Valkenburgh
ATTORNEYS.

Jan. 31, 1956   R. M. HENDERSON   2,732,690
ICE BARS AND MACHINE FOR AND METHOD OF MAKING SAME
Filed June 29, 1950   3 Sheets-Sheet 3
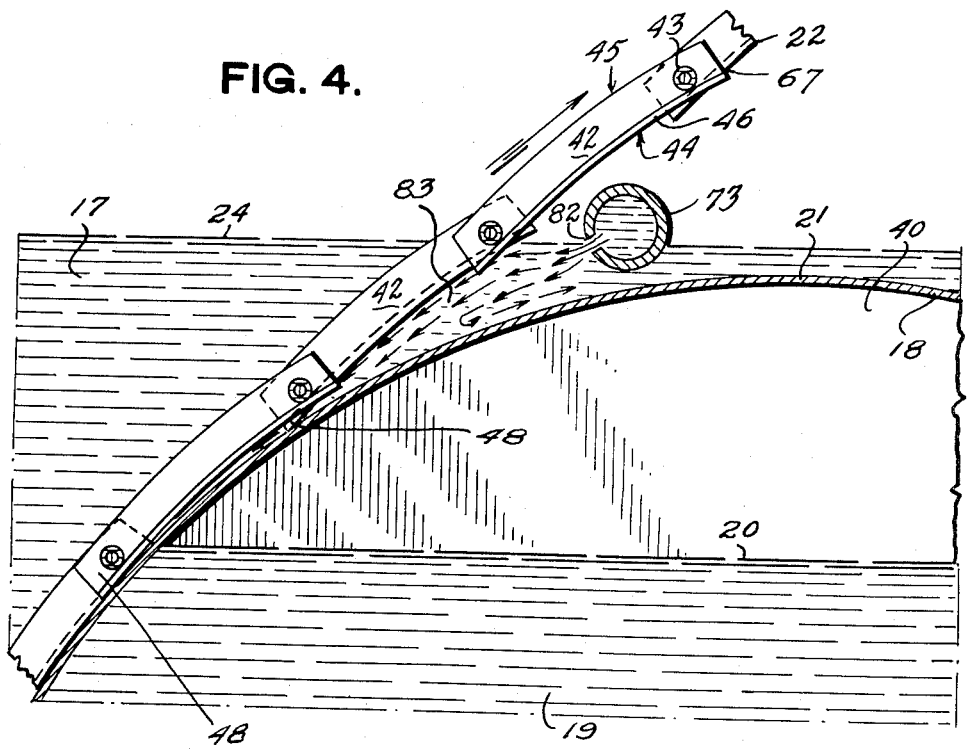
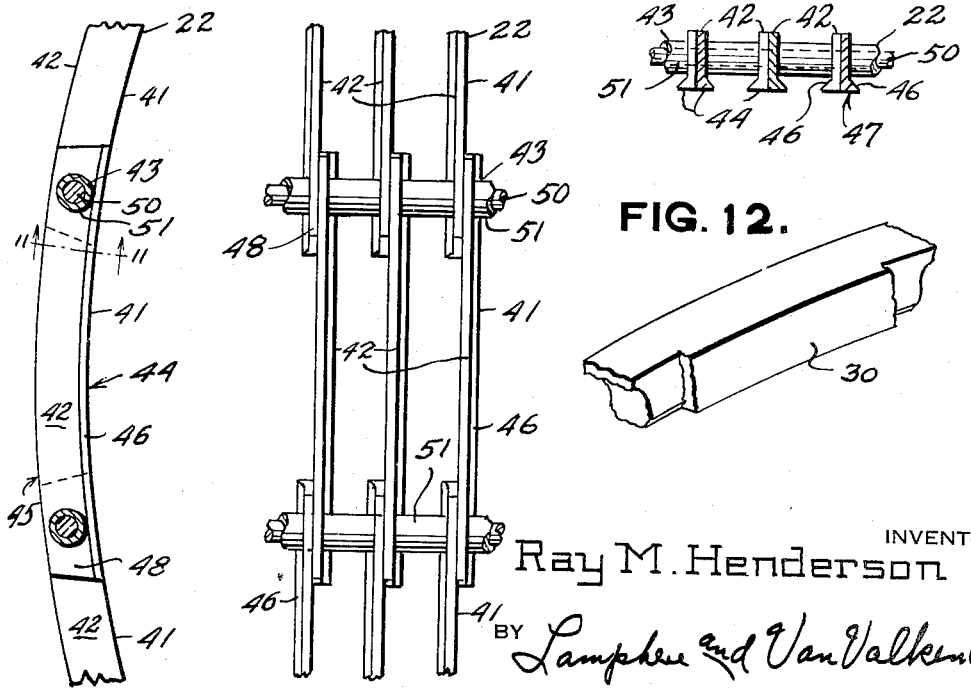
INVENTOR.
Ray M. Henderson
BY Lamphere and Van Valkenburgh
ATTORNEYS.

United States Patent Office 2,732,690
Patented Jan. 31, 1956

2,732,690

ICE BARS AND MACHINE FOR AND METHOD OF MAKING SAME

Ray M. Henderson, Whitmore Lake, Mich.

Application June 29, 1950, Serial No. 171,073

35 Claims. (Cl. 62—106)

This application is a continuation of my co-pending application Serial No. 459,816 filed September 26, 1942, for Ice Bars and Machine for and Method of Making Same, now abandoned.

The present invention relates to the manufacture of relatively small pieces of ice, suitable for dry refrigeration and for cooling water, beverages, frosted drinks, etc.

Because of the fact that the art of freezing small pieces of ice in various sizes and shapes is well known, this invention relates mostly to an improved structure for continuously freezing small pieces of ice and to the removal of pieces of ice after they have been formed. Further, because of the fact that the art of processing large pieces of ice to break, cut, or crush them into smaller and more desirable shapes and sizes is fairly simple and well known, this invention is especially concerned with means and methods of freezing and the freeing or loosening pieces of ice from the surface to which they are frozen to thereby make it possible to employ the ordinary methods to break, cut or chip it into smaller pieces after it has been loosened.

There are several methods of loosening ice from an evaporator surface that are being used at the present time, but all of these methods seem to be more or less impractical and have disadvantages. A method wherein warm water is sprayed or poured directly onto the exposed surface of the ice is common practice and extensively used, but with this method it is not possible to cause the heat to be conducted through the ice to the evaporator surface fast enough to make it possible to produce a very thick or desirable piece of ice. This method also causes considerable melting of the ice after it has been formed and before it is even removed from the machine in which it is made.

Another method in common practice is the supplying of heat or a heated substance to the interior of an evaporator to thereby conduct the heat so supplied to the outer surface of the evaporator to loosen the ice that has been formed thereon. This method is effective, but it is difficult in application, requiring complicated mechanism and controls, and because of the heating of parts unessential to the removal of the ice and which must be cooled by the refrigeration apparatus before more ice may be formed, this method is obviously costly and inefficient in operation. Another method of this nature is the application of a heating element on the inside of the evaporator which of course has many of the disadvantages mentioned.

Still another method is the application of sufficient force to the ice or portions thereof to break, tear, crush, or otherwise force the ice loose from the evaporator surface without defrosting or otherwise loosening the ice from the surface. The ice so produced is of very fine texture and its use is quite limited. Other disadvantages of this method are obvious.

Realizing the need for more efficient methods of producing small pieces of ice, it is the principal object of this invention to provide a simply constructed ice making machine capable of economically producing small pieces of ice that are suitable for most ice refrigeration needs, and to remove said pieces of ice from the machine in their approximately original frozen state without excessive breaking or crushing, and without excessive melting during the process of removal.

Another of the principal objects of the invention is to provide for the making of pieces of ice which will have a heavier body and more available refrigerating surface, and which will retain its frozen condition much longer than crushed, chipped or rice ice, no matter whether used for dry refrigeration or for cooling liquids by admixture therewith.

Another object of the invention is to accomplish the making of pieces of ice quickly by a machine occupying a minimum space. The invention contemplates materially cutting down the time required to freeze a piece of ice of a given thickness, or increasing the efficiency of the condensing unit by operating at a higher back pressure and freeze the same thickness of ice in the same length of time.

A further object of the invention is to provide an ice machine of the continuous operating class which does not require the use of knives or cutters for breaking or crushing the ice, but which separates the ice from the heat exchange parts of the machine, partly by the incoming water supply for ice making and ejects the ice from the machine in small bars of substantially uniform shape suitable to handle and convey mechanically, in such devices as ice slingers, conveyor belts, or auger conveyors, in loading cars, and iceing refrigerating bunkers.

A further object of the invention is to provide a method of producing ice bars of substantially uniform size and shape in which there are but few steps, and in which the steps of separating the ice from the heat exchange elements is least likely to materially melt the bars or break them into smaller units.

The invention also has for one of its objects the provision of movable heat exchange elements in the nature of link fins or belt parts, between which ice is formed and which are more efficient in conducting heat and cold, to increase the speed of operation of the machine.

Another object of the invention is to provide pieces of ice which, although small in size, pack loosely when they are thrown together, thus permitting the passage of air between the pieces, thereby increasing the accessible refrigerating surface. The pieces are preferably elongate bars of ice, each having an arcuate longitudinal axis and irregularly shaped ends, with very few flat faces. Thus, if a quantity of such pieces is stacked in a place where they partially melt and the pieces adhere or freeze together, they will not form a solid mass and therefore may again be easily broken apart.

Another object of the invention is to provide a method of using the heat carried into the machine by the make-up water, to loosen the ice from the freezing surface by defrosting, without causing material melting of the ice that has been frozen.

A still further object is to embody in an ice making machine of the continuous operating type having a member in which the ice is frozen and being removable from an evaporator surface, improved means for loosening or defrosting the bond of the ice from the evaporator surface when the member containing the ice is removed from said surface.

Another object of the invention is to provide a new method of conducting heat directly to the adhering surface of ice which has been frozen to a heat absorbing surface of a refrigeration evaporator to thereby melt the bond between the ice and the evaporator, without material melting of other portions of the ice.

A further object is to produce an ice making machine in which is embodied improved means for transferring heat from one portion of a surface to another portion which is otherwise inaccessible because of ice being frozen thereto.

Another object of the invention is to provide a method of preventing the formation of ice on a portion of the exposed surface of a refrigeration evaporator while ice is being formed on another portion of said surface, to thereby provide a portion of said surface which is free of ice and exposed to permit absorption of applied heat to thereby cause the heat applied thereto to be conducted through the wall of the evaporator to the other portion of said surface upon which ice is formed to thereby loosen the ice from the surface by melting, without material melting of the ice loosened thereby.

Another object of the invention is to provide a method of supplying and conducting heat to the unexposed surface of a marginal portion of a comparatively large mass of ice which has been formed on a refrigerated surface to thereby loosen the frozen bond between said marginal portion and said surface to permit easy removal of said portion of ice, without material melting of the ice, or without material heating of other parts of the refrigeration apparatus used to freeze the ice, especially the interior of the evaporator.

Another object of the invention is to provide a method of loosening marginal portions of a mass of ice which has been formed, by conducting heat from one portion of the surface on which the ice is formed to another portion, and breaking said marginal portions from the said mass, without heating the entire evaporator, or without causing excessive strain on the means used to break the marginal portion from the remaining mass of ice.

Another object of the invention is to provide leverage means to cooperate with other ice removing means of a chain type ice making machine and thereby prevent excessive strain on the chain or other parts of the machine.

Another object of the invention is to provide a flexible heat exchange partitioning means for an ice making machine to serve the dual purpose of conducting heat from water to form ice and conducting heat to the ice to facilitate the removal of the ice from the said means.

Another object is to provide in an ice making machine having a drum type evaporator and an endless belt means associated therewith for making ice, single means for causing the belt means to move in a direction away from the drum and also for causing the ice to be freed from the belt means.

Another object of the invention is to provide means to remove an ice partitioning means from a refrigeration evaporator surface after ice has been formed therein, apply heat to loosen the ice, and punch the ice therefrom after it has been loosened.

Other objects and advantages of the invention will appear in the following detailed description of the preferred embodiment of my invention, taken in connection with the accompanying drawings forming a part of this specification, and in which drawings:

Figure 2 is a sectional view on substantially the line 2—2 of Figure 1 looking in the direction of the arrows;

Figure 3 is a fragmentary view in elevation of a portion of one side of the machine showing a portion of means for supplying water to the machine;

Figure 4 is an enlarged detail view partly in elevation and partly in section of heat exchange elements and water inlet;

Figure 5 is an end elevation of a sprocket or ejecting roller;

Figure 6 is a fragmentary side elevation of the same;

Figure 7 is an end elevation of an idler;

Figure 8 is a fragmentary side elevation of the same;

Figure 9 is an enlarged fragmentary view partly in elevation and partly in section of fins and other elements of a portion of a heat exchange chain or belt;

Figure 10 is a plan view of the same;

Figure 11 is a sectional view on substantially the line 11—11 of Figure 9; and

Figure 12 is a perspective view on an enlarged scale of a bar of ice which may be produced by the machine.

Figure 1:
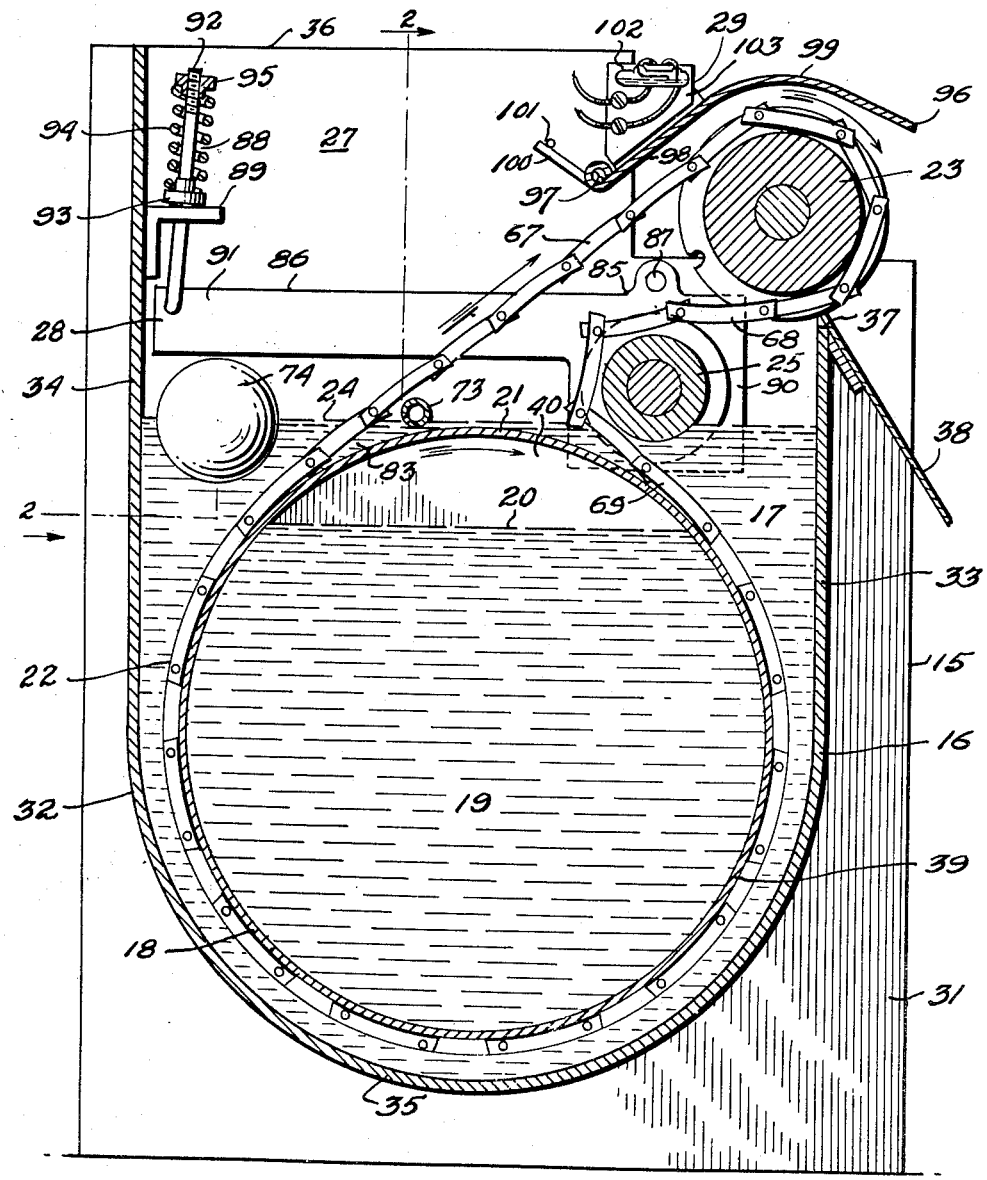
Figure 1 is a view partly in elevation and partly in vertical section through a machine constructed according to my invention.

The preferred embodiment of the machine comprises a main body portion 15, including a water tank 16 containing a body of water 17; a rotatable, horizontal freezing or heat exchange drum 18, also generally referred to as an evaporator, containing a refrigerant or freezing agent 19, preferably a liquid refrigerant having a liquid level 20 well below the top 21 of the drum; an endless heat exchange ice partitioning means, chain or belt 22 trained about a portion of the periphery of the drum; a sprocket or ejecting roller 23 for chain 22, rotatable about a horizontal axis, preferably located above the level 24 of the body of water 17 and laterally offset with respect to the drum 18; an idler 25 for chain 22, rotatable about a horizontal axis and located intermediate the sprocket 23 and drum 18; means 26 for supplying water to the tank and maintaining the water level 24 preferably above the top 21 of drum 18 and to provide a zone 27 in the upper part of the tank 16 in which runs of chain 22 are located as hereinafter described; means 28 cooperating with idler 25 to act as a chain or belt tightener; and control means 29 to stop operation of the machine in the event it clogs and the ice bars, such as that designated 30 in Figure 12, are not properly ejected from the machine.

I have not encumbered the drawings with illustration of any means for maintaining sufficient quantity of freezing agent 19 in the drum 18, since there are many ways in which such may be accomplished, the broad idea of such rotating drum containing a freezing agent being old in the art. The freezing agent, however, is a heat absorbing means, hereinafter referred to generally as a refrigeration evaporator, and is employed to absorb heat from water to form ice.

The main body portion 15 may be constructed in any suitable manner. In the example shown it comprises spaced side panels 31 spanned by a U-shaped member 32 providing end walls 33 and 34 and a curved bottom 35. These elements provide the water tank 16 and define the zone 27 in the upper portion of the main body. End wall 33 may terminate below the upper margins 36 of the main body as at 37, a distance sufficient to accommodate the sprocket 23, and a slide or chute 38 may extend downwardly and outwardly from the upper margin 37 of wall 33.

Drum 18 may be rotatably supported in tank 16, in any suitable manner. It comprises a circumferential wall 39 and end walls 40, and may occupy considerable of the space between the side panels 31. The circumferential wall 39 is preferably of metal or other good heat exchange material.

In the example shown I have provided a very novel heat exchange ice partitioning chain or belt 22 shown more in detail in Figures 4, 9, 10 and 11. It comprises a plurality of rows 41 of side by side, spaced apart fins 42, preferably of link-like formation, and means 43 pivotally connecting the fins of each row 41 to the fins of the adjacent rows. The fins 42 are flat and each has a concave edge 44 for surface contact with drum 18, the concavity being struck from substantially the same radius as the radius of the external periphery of the drum. Each fin preferably has an opposite convex edge 45, the convexity of which is struck from substantially the same center as that of the drum, so as to form therebetween, by heat exchange, an arcuate ice bar 30 as shown in Figure 12. Each fin is also preferably provided with at least one arcuate laterally extending flange 46 at its concave edge, one face 47 being flush with edge 44, for surface contact with the drum 18. It is also preferred to provide each fin with at least one lever-like end 48 extending beyond the pivot means 43, as shown in Figures 4, 9 and 10, for a purpose to be subsequently set forth. The pivot means 43 may comprise transverse rods or pins 50 and spacing ferrules 51. The fins may be economically made by stamping or casting. The flanges 46 increase the area of metal to metal surface of the fins or links with the outer periphery of the drum 18 and aid in keeping the fins perpendicular or normal to the face of the drum. Other means may of course be provided for hingedly connecting the fins, but the elements shown and described tend to prolong the life of the chain or belt 22 and render the machine easier to assemble. They also permit use of the idler 25 as a tightener.

In order to facilitate ejection of the ice bars from the machine, the sprocket or ejecting roller 22 is preferably located above the water level 24 and laterally offset with respect to drum 18, above the upper end of wall 33 and slide or chute 38. As shown in Figures 5 and 6, it preferably comprises a drum 53 having end trunnions 54 and a plurality of sets 55 of spaced teeth 56. A convenient way to provide these teeth 56 is to mold on or attach to the drum 53, spaced annular flanges 57 having circumferentially spaced notches 58 extending radially only part of the depth of the flanges, these notches to accommodate the ferrules 51 of the chain 22. By this construction channels 59 are provided between flanges 57 to accommodate the links. Motion may be imparted to this sprocket, in any suitable manner, for operating the machine.

The idler 25 is of somewhat similar construction in that it comprises a drum 61 having end trunnions 62 and spaced annular flanges 63 providing channels 64 to accommodate the fins of chain 22.

If desired, the outer edges of the teeth 56 may be rounded as indicated at 65 and the outer edges of flanges 63 rounded as at 66 to assist the fins of the chain finding their way into channels 59 and 64. The idler 25 need not be provided with notches in its flanges 63 since the trunnions of the chain may bear on the outer periphery of the flanges as shown in Figure 1.

The chain 22 is trained partially about drum 18, sprocket 23 and idler 25 in a manner to provide a run 67 tangential to the drum and sprocket; a run 68 tangential to the sprocket and idler, and a run 69 tangential to the drum and idler, as shown in Figure 1. This produces a reverse loop in the chain about the idler and facilitates ejection of the ice bars at the egress end of the machine.

The means 26 for supplying water to the tank 16 and maintaining the water level 24 preferably comprises a supply pipe 70, float valve 71, inlet pipe and fittings 72 and distributing pipe 73. Since it is desired to maintain the hydrant water at substantially normal temperature (70 or 80 degrees, or probably warmer) until it is admixed with the body of water 17 in tank 16, I prefer to locate the main body portion of float valve 71, as well as pipes and fittings 72, exteriorly of one of the side panels 31 as shown in Figures 2 and 3. Any suitable float valve may be provided. In the example shown, it comprises a float 74, rod 75, bell crank lever 76 acting on a rod 78 of valve proper 79, and a seat 80 in the valve body. These parts 74—76 may be conveniently located laterally of the run 67 of chain 22, so as to render the machine very compact.

The distributing pipe 73 has one end connected to the inlet pipe and fitting 72 and has its opposite end capped as at 81. It has one or more openings 82, located so as to direct the outflowing water into the body of water 17 at a zone 83 between the chain 22 and drum 18 where separation of the chain 22 from the drum takes place, as shown in Figures 1 and 4. Inasmuch as for every pound of ice removed from the machine, a pound of water enters the machine to take its place, a pocket of warm water is maintained between the drum surface and chain at zone 83.

It will be noted from Figure 1 that by maintaining the refrigerant level 20 below the point of contact between the heat absorbing surface of the evaporator and the chain where it leaves said surface to enter run 67, the formation of ice in zone 83 will be prevented, and this portion of the evaporator surface will continue to be free of ice and continue to be exposed to the heat which is supplied to this zone by the warm incoming water. This heat will therefore be absorbed by this exposed portion of the surface of the evaporator, and the evaporator wall, being of good heat conducting material, will conduct the heat absorbed thereby toward the colder portion of the evaporator upon which ice has been formed, and from which the ice has not yet been removed, to thereby defrost and loosen an adjacent marginal portion of the ice that has been formed, said portion being the next in line to be removed or broken from the main body of ice that has been formed on the evaporator surface.

It will also be noted from Figure 1 that as each lateral row of fins and the ice contained therein is removed from the evaporator surface, a new portion of said surface becomes exposed to the heat that is continuously supplied to zone 83, and a new marginal portion of the main body of ice which is frozen in the next lateral row of fins will be advanced to the position adjacent to zone 83 from where heat will again be conducted through the evaporator wall to defrost and loosen this new marginal portion of ice, which will in turn be removed and the same operation will be repeated to loosen and remove consecutive portions of ice. By the foregoing procedure it becomes obvious that means have been provided to cause heat to be absorbed by one portion of the surface of an evaporator and conducted to another portion of the same surface to thereby defrost or loosen by melting the bond between the surface and ice that has been frozen on the said surface.

It will also be noted that when the chain partitioning means 22 and the ice contained therein leaves the evaporator surface, each lateral row of links or fins pass zone 83 and also come in contact with the heat contained in this zone. This heat will therefore be picked up by the exposed edges of the fins to defrost the bond of the ice to the fins and loosen the ice for easy removal by the sprocket when the chain passes over it.

Because of the wide variation in temperatures of available water supplies in various localities, it is realized that additional heat may be necessary in the instances where the water is too cold to supply sufficient heat to zone 83 to defrost this bond between the freezing surfaces and the ice, and therefore it is not intended to limit the amount of heat so supplied by the available water supply. When additional heat is needed in the make-up water, it may be supplied in any desired manner, as by a heat exchanger to transfer heat from hot condenser water to the water supplied to pipe 73.

It will also be noted from Figure 1 that when motion is applied to the sprocket 23 to operate the machine, the transverse row of fins adjacent to zone 83 will leave their relative position with respect to other rows of fins on the evaporator surface and become aligned with the fins moving in run 67. To accomplish this change in position, this row of fins must swing on the pivot rod 50. It will be noted from Figure 12 that ice is formed around and interlocked with the pivot means 43 and, therefore, when this swinging action is accomplished, the ice which is formed between the heat exchange plate-like partitioning members, herein referred to as fins, or rather the ice that is formed either on the top or the bottom of the pivot means 43 will either be broken or crushed to thereby break or separate the portion of the formed ice, formed in this lateral row of fins which have been moved, from the main body of ice which is frozen between the fins which still retain their position on the drum surface. It therefore becomes obvious that considerable force must be applied to cause this breaking and crushing of ice to break this marginal portion of the ice from the main body of ice, and that without assistance in said breaking and crushing of ice, excessive strain would be applied to the chain. Therefore, leverage extensions 48 have been provided to multiply the forces applied to the chain to thereby prevent said excessive strain from being applied to the chain. It will therefore become obvious that by a new method of applying heat to defrost and loosen the ice from the evaporator, and by supplying prying or leverage means to break marginal portions of the ice from the main body of ice, a method has been provided to remove ice from the surface of a refrigeration drum, without excessive melting of the ice, or without applying excessive strain on the mechanical parts of the machine.

In the example shown I have provided means 28 cooperating with idler 25 to act as a chain or belt tightener. This means preferably comprises oppositely disposed support assemblies 85, one of which is shown more in detail in Figure 1. Each assembly comprises a lever 86, pivoted as at 87 to the inner face of each adjacent side panel 31, and an adjustable tensioning device 88 for each lever 86, supported on a bracket 89. The shorter end 90 of each lever 86 receives one of the trunnions 62 of idler 25 and the longer arm 91 is pivotally connected to device 88. This device comprises a stem 92 extending through bracket 89 on which bears a washer 93, surrounded by expansion spring 94, normally compressed to the desired degree by a nut 95 on the upper threaded end of rod 92. The lower end of this rod is pivotally connected to the longer arm 91 of lever 86. By this construction the idler 25 may be moved toward or from the run 67 of chain 22, as is obvious from an inspection of Figure 1.

It will also be noted further from Figure 1 that as each transverse row of the said plate-like partitioning members approach the sprocket 22 while moving in run 67, the ice between the said plate-like members will be contacted by the teeth 56 and thereby be forced upwardly until removed from the chain. It is obvious that, if the frozen bond between the plate-like members and the ice has been adequately melted and the ice has been sufficiently loosened thereby, the pieces of ice will be easily removed. However, it is also obvious that, if the water in zone 83 did not contain sufficient heat to adequately loosen these pieces of ice, their removal would be difficult and if safety means were not provided, the chain might be broken. Therefore, spring release means 28 has been provided to cooperate with idler 25 to relieve the strain placed against the chain and permit the chain, at the point where pressure is being applied, to leave its normal path of travel and be raised at this point of pressure. It will therefore be obvious that this raising action of one transverse row of plate-like members, together with the action of the adjacent row of members which is starting to descend on the downwardly moving part of the sprocket, and because of the fact that the radius of the sprocket 22 is much less than the radius of the evaporator 18, the two transverse rows of the said members so affected will swing on their intermediate pivoting means, in an opposite direction from the pivoting action caused when the said members were moved from the evaporator surface, to thereby cause additional breaking and crushing of the ice at the pivoted connection and to also cause the said leverage extensions 48 to act in reverse and move upwardly to cause the flanges 46 on said extensions to engage the pieces of ice and, together with the force applied by the said teeth of the sprocket, cause the pieces of ice to be removed from the chain. It will therefore become obvious that a method has been provided to melt and loosen the frozen bond between the surfaces of spaced apart rigid heat exchange plate-like members of a flexible heat exchange partitioning means and the ice formed therein, and punching the ice therefrom after said loosening operation. It is further obvious that a method of removing ice from a flexible heat exchange partitioning means has been provided, wherein the flexing of said partitioning means cooperates with a punching means to thereby cause the ice to be removed from the partitioning means without exerting excessive pressure or strain against either the partitioning means or the punching means. It will be still further obvious that spring safety means have been provided to release excessive strain on the ice removing parts of an ice making machine to thereby prevent breakage of said parts by the application of excessive force in the removal of said ice. It will be still further obvious that leverage means have been provided to cooperate with the swinging action of the swingably fastened together members of a flexible heat exchange ice partitioning means to thereby multiply the force applied to said means to remove the ice therefrom.

The means 29 to stop operation of the machine in the event too much ice is formed on the chain or the idler does not properly eject the ice bars, may comprise a hood 96 pivoted as at 97 and having a straight portion 98 normally paralleling run 67 and an arcuate portion 99 normally paralleling the sprocket 23; a stop arm 100 and pin 101 to normally hold the hood a sufficient distance from the sprocket as to not interfere with normal ejection of the ice bars from the chain, and a control element 102, such as a mercury switch, actuated by the hood in the event ice piles up on the idler or the ice formed on the chain becomes considerably thicker than the width of the fins. In the example shown, the mercury switch is shown mounted on the hood as by bracket 103.

In the operation of the machine, the chain partitioning fins are held tightly against the drum as they pass below the surface 24 of the water 17 to thereby provide secondary freezing surface. Heat in the water is absorbed by the fins and transferred from the surface of the drum, thence through the wall of the drum to the refrigerant to be absorbed thereby. From there it is carried to the usual condensing unit. The exposed portion of the drum will also absorb heat from water 17 wherein prime freezing surface is provided. As the drum rotates in the direction indicated by the arrow, ice will be formed between the fins of the chain. Adjacent zone 83, the strips of ice between the series of fins will be separated from the evaporator surface, partly due to the prying action of the fins, and more particularly by the heat of the incoming water which is absorbed by the exposed portion of the evaporator surface in zone 83 to which the ice is frozen to thereby melt the bond between the ice and the surface so that the duty of the prying action of the fins is mainly to assist the fins to swing on the pivoting means to thereby crush or break the ice on or around the said pivoting means to thereby define and separate small marginal portions of the ice that is frozen between the rows of fins. The frost tending to cause the ice bars to adhere to the fins will be melted at run 67 so that the duty of sprocket 23 is mainly to have its teeth or ribs force the ice bars from the chain by "cam action," as is obvious from an inspection of Figure 1. As the ice bars are forced from the chain, they push ice bars in advance of them under hood 96 and finally fall upon slide or chute 38.

In Figure 12 is illustrated, on a greatly enlarged scale, one of the ice bars from which it will be noted that it is of elongate shape having an arcuate longitudinal axis. These bars, although small in size, pack loosely when they are thrown together, thus permitting the passage of air between the pieces to increase accessible refrigerating surface as previously described. The bars have very few flat faces so that a quantity of such pieces may be stacked in place and if they partially melt, they will to some extent, adhere or freeze together, but will not form a solid mass. They may be easily broken apart with little force.

It will be obvious that the steps taken to provide relatively small pieces of ice, such as ice bars, may be accomplished by apparatus more or less differing in specific details from that herein shown and described. Hence, I do not limit the invention to the particular embodiment herein presented for purposes of illustration, but reserve all such variations, modifications and mechanical equivalents as fall within the scope and spirit of the following claims. It is to be further noted that although I have illustrated a so-called drum as a refrigeration evaporator, my method of making ice can be embodied in other partitioning means acting as secondary refrigeration surfaces associated with an evaporator other than a drum providing a prime refrigerating surface.

What is claimed is:

1. In a machine for making ice bars, a heat exchange drum, and a heat exchange chain trained about a portion of the periphery of said drum, said chain including laterally spaced apart plate-like fins, normal to the periphery of the drum, said fins each having a concave edge and the concavity of each fin having a radius equal to the radius of the external periphery of said drum for surface to surface contact with the latter, and each fin provided with at least one arcuate laterally extending flange flush with its concave edge.

2. In a machine for making ice bars, a heat exchange drum, and a heat exchange chain trained about a portion of the periphery of said drum, said chain including laterally spaced apart plate-like fins normal to the periphery of the drum and transversely extending pivot means for the fins, said fins having lever-like ends extending beyond the pivot means for prying the chain from the drum at the portion of the run of the chain which is tangential to the drum.

3. In a machine for making ice bars, a heat exchange drum, and a heat exchange belt-like member trained about a portion of the periphery of said drum, said member including a plurality of spaced fins provided with laterally extending flanges for surface contact with the periphery of the drum.

4. A machine for making ice comprising a water tank, a rotatable heat exchange drum containing a freezing agent, submerged in a body of water in said tank; a sprocket above said body of water; and an endless heat exchange chain, comprising a plurality of rows of side by side fins spaced transversely of the chain, serving as links thereof, trained about said sprocket and said drum, said sprocket having laterally spaced apart teeth corresponding in number to the number of spaces between the fins of any transverse row of fins and adapted to extend between said fins as the chain travels in contact with the sprocket.

5. A machine for making ice comprising a water tank, a rotatable heat exchange drum containing a freezing agent, submerged in a body of water in said tank; a sprocket above said body of water; and an endless heat exchange chain, comprising a plurality of rows of side by side fins spaced transversely of the chain, serving as links thereof, trained about said sprocket and said drum, said sprocket having laterally spaced apart teeth corresponding in number to the number of spaces between the fins of any transverse row of fins, the teeth on said sprocket being of sufficient height to eject the ice formed between the fins as the chain passes over the sprocket.

6. A machine for making ice in a continuous manner comprising a water tank; a rotatable horizontal heat exchange drum continuously rotatable during ice making containing a freezing agent, submerged in a body of water in said tank; a sprocket rotatable about a horizontal axis above and laterally offset with respect to said drum so as to extend at least partially beyond a vertical plane tangent to a wall of the tank; an idler rotatable about a horizontal axis between said sprocket and drum; and an endless heat exchange chain having double open compartments made of non-stretchable material and being trained about said drum, sprocket and idler, to provide a tangential run between the drum and sprocket which leaves the drum below the water level and tangential runs between said drum and idler, and said sprocket and idler, substantially as and for the purpose set forth.

7. A machine for making ice comprising a water tank; a rotatable heat exchange drum containing a freezing agent, submerged in a body of water in said tank; a sprocket above said body of water; and an endless heat exchange belt trained about said drum and sprocket, said belt provided with a series of rows of transversely spaced slots throughout its length, and said sprocket provided with a series of rows of transversely spaced teeth throughout its circumference adapted to enter said slots, to eject ice formed in the slots.

8. A machine for making ice comprising a water tank; a rotatable heat exchange horizontal drum, containing a freezing agent, wholly submerged in a body of water in said tank; an endless heat exchange chain-like belt trained about a portion of said drum and having an upwardly extending run tangential to the drum near the surface of said body of water; and a water supply pipe, extending parallel to the axis of the drum adjacent the lower portion of said run of the belt, and provided with one or more openings to direct the outflowing water of the pipe into the zone between said run and drum.

9. A machine for making ice comprising a water tank; a rotatable heat exchange horizontal drum, containing a freezing agent, wholly submerged in a body of water in said tank; an endless heat exchange chain-like belt trained about a portion of said drum and having an upwardly extending run tangential to the drum near the surface of said body of water; and means for supplying water to the tank at the zone between said run and the belt and said drum.

10. The method of producing arcuate ice bars, which consists in training a heat exchange chain-like belt, having relatively long arcuate spaced fins, through a body of water and in surface to surface contact with a portion of the periphery of a rotating heat exchange drum containing a freezing agent, and prying the fins and the arcuate bars of ice formed therebetween from the periphery of the drum while submerged in said body of water and by a lifting lever action.

11. The method of producing ice bars, which consists in training a heat exchange chain-like belt, having spaced apart fins, through a body of water and in contact with a portion of the periphery of a rotating heat exchange drum containing a freezing agent, and prying the fins and the ice bars formed therebetween from the periphery of the drum by a lifting lever action while submerged in said body of water.

12. The method of producing ice, which consists in moving a chain through a body of water in contact with simultaneously moving heat exchange member, containing a freezing agent; separating said chain from said freezing member after ice has been formed between the links thereof; and introducing warm water into the said body of water at the zone between the chain and heat exchange member where the separation of the chain from said member takes place.

13. The method of producing ice, which consists in moving a heat exchange chain through a body of water in contact with a simultaneously moving heat exchange member, containing a freezing agent; separating said chain from said freezing member after ice has formed between the links thereof; and directing warm water into said body of water to impinge upon the face of said chain which contacts said heat exchange member and adjacent the zone where the separation of the chain from the said member takes place.

14. In a machine for making ice, a refrigerated arcuate surface, a body of water adjacent the surface, means comprising a flexible structure extending over and engaging the surface and adjacent which ice is formed, means for causing said member to be raised from the surface and to extend tangentially thereto after ice is formed, and means for supplying water to the body of water at the zone between the tangentially extending portion of the flexible structure and the arcuate surface and adjacent the point where the said tangentially extending portion leaves the arcuate surface.

15. In a machine for making ice, a refrigerated rotatable drum, a body of water about said drum, means comprising an endless member trained over the drum and adjacent which ice is formed, said member having a tangential run to the drum adjacent the surface of the water, and means for supplying water to the body of water at the zone between the run and the drum and adjacent the point where the run leaves the drum.

16. A chain member for separable association with the outer surface of a refrigerated member of an ice machine having an arcuate outer surface, said chain comprising heat exchange elongated plate-like links connected together for relative movement with the edge surface of each link which is arranged to contact the refrigerated arcuate surface also being arcuate and having the same radius of curvature as the said refrigerated surface to thereby insure full surface contact of said edge with the refrigerated arcuate surface for maximum heat transfer, said links each also being provided with an integral laterally extending flange portion having a surface which is arcuate and continuous with the arcuate edge surface of the link to thereby increase the heat exchange surface of the link which contacts the refrigerated surface and to additionally provide lifting means for assisting in removing ice from congealed engagement with the refrigerated surface when the link is moved away from said refrigerated surface.

17. In a machine for making ice, a refrigerated arcuate surface, a body of water adjacent thereto, a plurality of flexible structures extending over and engaging the arcuate surface, each of said flexible structures comprising pivotally connected heat exchange platelike links normal to the arcuate surface and said structures being spaced apart in the axial direction of the arcuate surface, each of said links of a structure having a curved edge surface in full contact with the refrigerated surface and being so formed and related to an adjacent link of an adjacent structure that an ice forming space will be created that is open to the refrigerated arcuate surface and said space will have between its side walls formed by the links of said adjacent structures a distance that is the least adjacent the arcuate surface and the greatest at the most remote point from said surface and at intermediate points not less than any points closer to the drum.

18. In a machine for making ice, a refrigerated drum, a body of water adjacent thereto, and a plurality of endless members trained about a portion of the periphery of the drum and movable simultaneously therewith, each of said endless members comprising pivotally connected heat exchange plate-like links normal to the periphery of the drums and said members being connected together in predetermined spaced relation axially of the drum, at least some of the pivots and the links of each member being so formed and related to adjacent links of an adjacent member that an ice forming space will be created that is open to the drum and which has a distance between its side walls formed by links of adjacent members smaller adjacent the drum than at the most remote point and at intermediate points not less than at points closer to the drum.

19. In a machine for making ice, a water tight compartment; a drum rotatably mounted within said compartment; means for refrigerating said drum; structure for removing ice from the drum, comprising an endless flexible member trained over the drum and having a run tangential to the surface of the drum, and means for supplying relatively warm make-up water to the machine in a zone defined in part by said run and the adjacent surface of the drum.

20. A heat transfer device, comprising a heat transfer surface, a flexible structure adapted to be contacted with said surface, means for taking portions of said flexible structure out of and back into contact with said surface, and means comprising conduit means for supplying a fluid to a portion of said surface out of contact with said flexible structure to remove material adhering thereto.

21. A refrigeration device, comprising a drum, an endless flexible structure around said drum and having a free part and a part in contact with said drum, the length of said flexible structure being greater than the circumference of said drum so that a portion of said flexible structure is out of contact with said drum, means for taking successive portions of said flexible structure out of and back into contact with said drum to form engaged and disengaged portions of said drum and flexible structure, means for refrigerating an engaged portion of said drum, and means for first applying a material to be congealed to a disengaged portion of said drum, removing such material therefrom before it congeals by replacing it with other material to be congealed, and then applying such material to an engaged portion of the said flexible structure for congelation.

22. In a machine for making ice, a refrigerated surface, a body of water adjacent thereto, a plurality of members for separable direct engagement with the refrigerated surface and arranged in lateral spaced relation, each of said members being formed of longitudinally arranged links so joined together that there is relative movement therebetween, and means for moving the members away from the refrigerated surface after ice is formed in the space between adjacent members, each of said links being so formed and associated with an adjacent link of a member that when a portion thereof is moved relatively to said succeeding link in a direction away from the refrigerated surface it will produce a lifting lever action on the said succeeding link and move it, together with ice congealed thereto away from the said refrigerated surface.

23. A chain member for separable direct engagement with a refrigerated surface of an ice making machine, said chain comprising links pivotally connected together for relative movement with each link having means so extending beyond its connection with a succeeding link and so related to said succeeding link that when a link is moved away from the refrigerated surface its extending portion will fulcrum on the said surface and produce a lifting lever action on the succeeding link through its pivotal connection therewith away from the surface.

24. In combination with a prime refrigerated surface having a body of water in contact therewith, a belt-like member for immersion in the water and in direct contact with the prime refrigerated surface for forming blocks of ice, said belt-like member comprising a plurality of heat exchange plate-like links pivotally connected together to form a plurality of spaced apart rows forming double-open compartments in which ice can be formed, said links having laterally extending heat exchange flanges along their edges at the face of the belt for full contact with the refrigerated surface.

25. An ice block forming structure for separable association with a refrigerated surface of an ice making machine, said structure comprising a plurality of side by side flexible members, each of said flexible members being constructed of plate-like links arranged longitudinally and pivotally connected together at adjacent ends, each of said links having a portion extending beyond its pivotal connection with a succeeding link and so related to said succeeding link that when a link is swung about its pivotal connection with a succeeding link and in a direction away from the refrigerated surface its extending portion will immediately upon said movement be capable of fulcruming on the refrigerated surface and produce a lifting leverage on the succeeding link and move it together with formed ice congealed thereto away from said surface.

26. In a machine for making ice blocks, a prime refrigerated surface, a supply of water adjacent thereto, a chain structure positionable in the water and directly in contact with the refrigerated surface and providing double-open compartments in which ice can be formed, said chain structure including a plurality of laterally spaced apart connected link structures, each of which comprises longitudinally positioned plate-like links pivoted together at adjacent ends for relative movement, a combined guide and punching rotatable member positioned outside the water and provided with teeth arranged to be received in the compartments formed by the laterally spaced link structures and from that side which will be adjacent the refrigerated surface, and means for moving the chain away from the refrigerated surface and out of the water and so positioning it with respect to the toothed member that the teeth will force ice frozen in the compartments out of said compartments on the open sides opposite the open sides entered by the teeth.

27. In a machine for making ice blocks, a refrigerated surface, a supply of water adjacent said surface, a chain structure for separable direct engagement with the refrigerated surface and providing double-open compartments in which ice blocks can be formed, said chain structure comprising a plurality of flexible members arranged in laterally spaced relation with each member embodying plate-like links longitudinally arranged and pivotally connected together for relative movement, a combined guide and punching rotatable member positioned above the body of water and provided with teeth so spaced that when the chain is trained thereover teeth will project between the laterally spaced links forming the compartments from the side which has been toward the refrigerated surface and thereby remove the formed blocks of ice, and means for moving the chain away from the refrigerated surface and causing it to be trained over the member provided with the teeth.

28. In apparatus for making ice blocks, a body of water, means for absorbing heat from the water to form ice, including a refrigerated surface contacted by the body of water, a mold structure positionable in the water on direct contact with the refrigerated surface and providing compartments in which ice can be formed, said ice mold structure including laterally spaced apart rows of plate-like members swingably fastened together at their adjacent ends for relative movement, the laterally spaced plate-like members thereby forming compartments having opposed open sides between members, a combined guide and punching rotatable member positioned outside the water provided with laterally spaced rows of spaced apart teeth, and arranged to be received in the compartments from that side which has been toward the refrigerated surface to remove the ice which has been formed in the said compartments.

29. In an ice making machine, means including plate-like metal members of good heat exchange material pivoted together to establish a flexible structure provided with partitions in which blocks of ice can be frozen, a refrigerated surface for absorbing heat and on which the flexible structure can be positioned, a body of water to be frozen in between the partitions, means for removing the flexible structure from the refrigerated surface, means to supply heat to the flexible structure at a point closely adjacent the portion of the refrigerated surface from which the flexible structure is removed and between said flexible structure and the said surface to thereby loosen the ice, punching means for punching the ice out of the flexible structure on the side opposite the side which is toward the refrigerated surface during ice making, and means for causing the flexible structure to so cooperate with the punching means that the plate-like members will have relative movement about their pivots during the punching operation.

30. In an ice making machine, a prime refrigeration surface arranged to absorb heat from a body of water to thereby form ice, a chain formed of spaced apart heat exchange plate-like partitioning members swingably fastened together at their adjacent ends for relative movement and adapted to be arranged in the body of water in heat exchange relation with said prime refrigeration surface to thereby provide secondary heat absorbing means to cause ice to be formed in relatively small pieces between said partitioning members, means to remove said partitioning members and the ice formed therebetween from heat exchange relation with said prime refrigeration surface, and punching means arranged to force the said pieces of ice from between the said partitioning members after said removal and in a direction away from the side of the pieces of ice which were on the prime refrigeration surface, said punching means having such position with respect to the chain and so cooperating therewith during punching that the partitioning members will have relative swinging movement.

31. In an ice making machine, a prime refrigeration surface arranged to absorb heat from a body of water to thereby cause ice to be formed on said surface, a body of water adjacent said surface, spaced apart plate-like heat exchange members arranged on said surface to provide secondary heat absorbing surfaces and to cause the ice to be formed in relatively small pieces and bonded thereto, means to remove the said plate-like members and the ice so formed and bonded to said members from the said prime surface, means to punch the ice from between said members after said removal and in a direction away from the side of the heat exchange members that cooperate with the refrigeration surface, means moving the said heat exchange members and the ice frozen thereto through a heated zone in said machine after said removal which zone is between the heat exchange members and the prime refrigeration surface to thereby melt the bond between the ice and the said members before the ice is punched therefrom, and means for supplying heat to said zone by a heat source within the zone.

32. In an ice making machine, a receptacle to hold a body of water, a refrigerated surface arranged to absorb heat from the water to thereby form ice, a heat exchange ice partitioning means comprising spaced apart rigid plate-like members positionable on the said refrigerated surface to thereby cause the ice to be formed in relatively small pieces between the said plate-like members, means to remove the said partitioning means and the pieces of ice formed therein from the refrigerated surface, means arranged in spaced relation to the refrigerated surface to forcefully eject the said pieces of ice from the said partitioning means in a direction away from the side of the partition means which cooperates with the refrigeration surface, means to cause the said partitioning means and the pieces of ice formed therein to pass through a heated zone between the said refrigerated surface, the partitioning means and said ejecting means to thereby loosen the bond between the ice and the said partitioning means by a melting action prior to being acted on by the said forceful ejecting means, and means supplying heat to said zone by a heat source within the zone.

33. In an ice making machine, means establishing a surface from good heat conducting material, a body of water adjacent the surface, means for establishing a prime refrigeration surface over a portion of said first named surface to thereby form ice, heat exchange members associated with the surface and establishing secondary heat absorbing surfaces, and means in direct contact with another portion of the said first named surface for heating the surface, said other surface being contiguous with the prime refrigeration surface associated with the heat exchange members and conducting heat to the contiguous prime refrigeration surface to melt the bond between said surface and the ice frozen thereto so as to facilitate the removal therefrom of the ice by the heat exchange members.

34. In an ice making machine, a refrigeration evaporator providing a prime freezing surface to absorb heat from a body of water to form ice on the surface, a body of water adjacent to the freezing surface, means for continuously applying heat to a portion of the freezing surface from a heat source having direct access to said portion of the freezing surface, said portion of the freezing surface being contiguous with a portion of the surface upon which ice has been formed whereby heat can be conducted rapidly through the freezing surface to the contiguous portion upon which ice has been formed to eliminate by melting the bond between the freezing surface and a portion of ice adjacent said heated portion of the surface, means applying a lifting force to said freed portion of ice to break it from ice which has not been so freed and which still remains frozen to the freezing surface, and means to repeat the said operation to thereby remove additional marginal portions of said ice.

35. In an ice making machine, a refrigeration evaporator arranged to absorb heat from water to form ice, a body of water adjacent to the surface thereof, a chain partitioning means comprising sections of spaced apart plate-like dividers positioned on said surface to thereby cause the ice to be formed between the said plate-like dividers on said surface, said plate-like dividers being swingably fastened together so as to establish sections for relative movement, means causing said sections to progressively and individually swing away from said surface to thereby remove the ice formed between the said plate-like dividers in each section from the said evaporation surface to thereby expose a portion of said surface, a source of heat means for continuously supplying heat from said source to the exposed portion of said surface, said means supplying heat to the evaporator surface from which a section has been swung away immediately upon the section leaving the surface whereby heat will be conducted through the evaporator wall to the adjacent unexposed portion of said surface to which ice formed in the succeeding section of the chain is bonded and the said section being swung away from the evaporator surface.

References Cited in the file of this patent

UNITED STATES PATENTS

| Number | Name | Date |
|---|---|---|
| 1,836,422 | Woodman | Dec. 15, 1931 |
| 2,031,812 | Barrett | Feb. 25, 1936 |
| 2,054,073 | Field | Sept. 15, 1936 |
| 2,054,074 | Field | Sept. 15, 1936 |
| 2,054,101 | Short | Sept. 15, 1936 |
| 2,064,655 | Geyer | Dec. 15, 1936 |
| 2,252,913 | Baer | Aug. 19, 1941 |
| 2,267,789 | Conn | Dec. 30, 1941 |
| 2,310,646 | Morgan | Feb. 3, 1943 |
| 2,387,899 | Gruner | Oct. 30, 1945 |
| 2,443,203 | Smith | June 15, 1948 |